Figure 6:
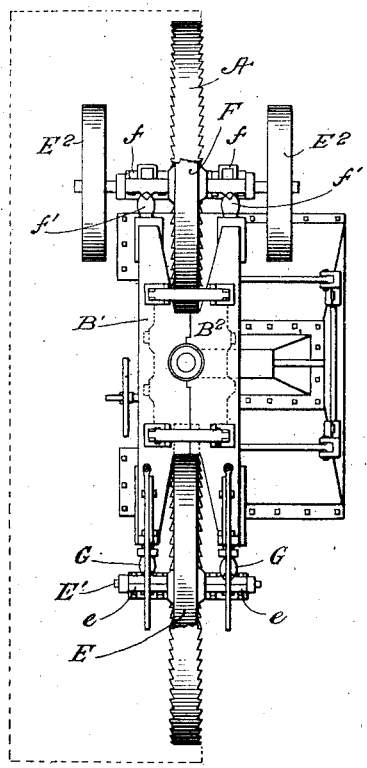

No. 879,038. PATENTED FEB. 11, 1908.
E. T. DAVIES.
SAWING APPARATUS.
APPLICATION FILED NOV. 16, 1906.
2 SHEETS—SHEET 1.
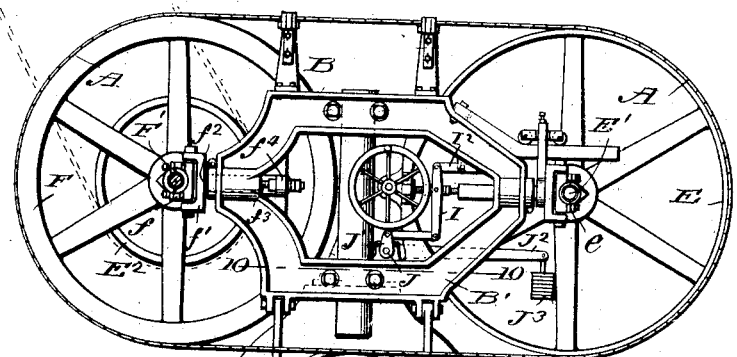
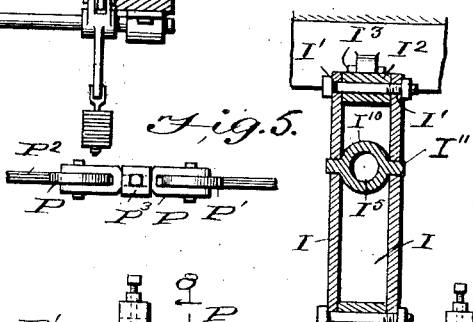
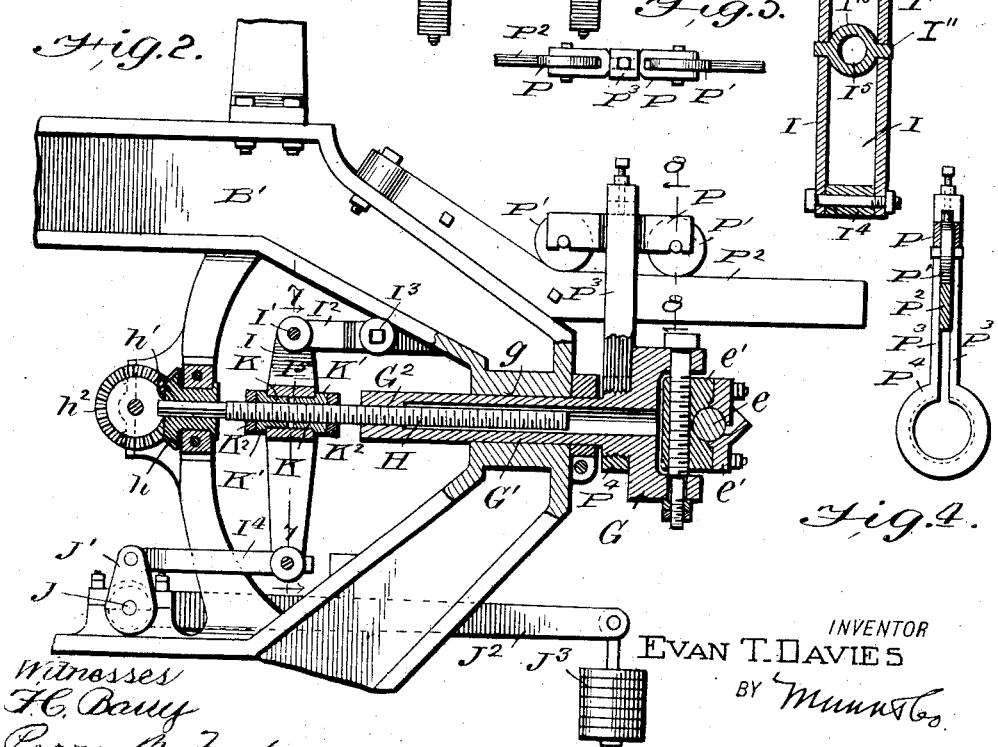
INVENTOR
EVAN T. DAVIES
BY Munn & Co.
ATTORNEYS
Witnesses No. 879,038.

PATENTED FEB. 11, 1908.

E. T. DAVIES.
SAWING APPARATUS.
APPLICATION FILED NOV. 16, 1906.

2 SHEETS—SHEET 2.

WITNESSES
L. H. Schmidt.
Perry B. Turpin.

INVENTOR
EVAN T. DAVIES.
BY Munn & Co.
ATTORNEYS

UNITED STATES PATENT OFFICE.

EVAN T. DAVIES, OF PORTLAND, OREGON.

SAWING APPARATUS.

No. 879,038.

Specification of Letters Patent.

Patented Feb. 11, 1908.

Application filed November 16, 1906. Serial No. 343,701.

*To all whom it may concern:*

Be it known that I, EVAN T. DAVIES, a citizen of the United States, and a resident of Portland, in the county of Multnomah and State of Oregon, have invented certain new and useful Improvements in Sawing Apparatus, of which the following is a specification.

My invention is an improvement in sawing apparatus, and consists in certain novel constructions and combinations of parts as will be hereinafter described and claimed.

In the drawings Figure 1 is a vertical cross-section on about line 5—5 of Fig. 1. Fig. 2 is a detail face view partly broken in section of the saw frame illustrating the straining device. Fig. 3 is a detail vertical section on about line 7—7 of Fig. 2. Fig. 4 is a detail vertical section on about line 8—8 of Fig. 6. Fig. 5 is a detail top plan view of the carriage for the straining device, and Fig. 6 is a top plan view of the improvements, parts being broken away.

The band saw A is carried on wheels or pulleys E and F whose arbors E' and F' are mounted in boxes $f$ and $e$ carried by the sections B' and B² of the saw frame. The boxes $f$ are mounted in yokes $f'$ having shanks $f^2$ slidable in the frame at one end thereof and arranged to be set up to any desired position by means of the screw $f^3$ passed through a bearing $f^4$ and having nuts on opposite sides of said bearings so the boxes $f$ may be adjusted as desired. The wheel or pulley F is weighted to form a balance wheel and drives the band, preferably by two belts applied to band pulleys E² on the arbor $e$ of the pulleys E. These two belts are applied from above to help counter-balance the saw frame.

The saw straining gear device provides means whereby the arbor of the pulley E may be set forward or back from the arbor of the pulley F, and comprises in connection with the yokes G carrying the boxes $e'$ for the arbor $e$, hollow shanks G' movable longitudinally in bearings $g$ in the frame sections B and B' and having at their inner ends threaded bearings at G² to receive screw shafts H which being threaded in the bearings G² will when turned operate to move the yoke G relatively to the screw shaft H, and thus secure proper tension between the said parts. This screw shaft may be turned in any suitable manner. As shown beveled pinions $h$ are journaled in bearings in the frame B and have square bores $h'$ through which an angular portion on the screw shaft H may slide and be driven by bevel pinions $h^2$ meshing with the pinion $h$ to turn the same and thus turn the screw shafts, as best shown in Fig. 2 of the drawings. Levers I are pivoted at one end I' to one end of links I², whose other ends are pivoted at I³ to the frame sections, and these levers I are connected at their other ends by connecting rods I⁴ to cranks J' on a shaft J to which is connected a weighted lever J² whose weights J³ may be regulated according to the tension it is desired to put upon the band. The levers I connect between their ends with their respective screw shafts H, such connection being preferably adjustable and effected by means of a collar I¹⁰ having studs I¹¹, see Fig. 3, pivoted to the side plates of the levers and nuts K threaded on the screw shaft H and projecting or sleeved in opposite directions into the opening I⁵ in the collar I¹⁰ about midway between the ends of the levers, the nuts being free to turn in the opening I⁵ so they may turn with the screw shaft H when adjusted thereon and having heads K' at their outer ends bearing against the front and rear sides of the collar I¹⁰ to secure the same in connection with the screw shaft H. Manifestly by turning these nuts K in either direction along the screw shaft H the point of connection of the lever I with the screw shaft may be varied and when the desired adjustment and alinement is secured, the nuts K may be locked in position by the jam-nuts K², as will be understood from Fig. 2 of the drawings. By this means I am able to adjust the connection of the straining device with the shaft H and also to adjust the said shaft H relatively to its connection with the yoke carrying the box for the arbor in order to secure the desired straining or tension of the saw in the operation of the invention.

When the yokes carrying the arbors $e$ are adjusted toward their outermost positions they project considerable distance from their bearings $g$ on the saw frame, and to support this overhanging projection I prefer to provide carriages P having rollers P' running on a track P² and a depending portion or hanger having side bars P³ extending down on opposite sides of the said track P² and supporting at their lower ends collars P⁴ threaded on the shanks G' and held thereto, so the shanks G' move out and in with the operation of the straining gear being suspended from the rollers P' of the carriage P.

What I claim is—

1. The combination of a supporting frame, a saw frame movable vertically upon the supporting frame, means for moving the saw vertically, wheels for supporting a band saw, a band saw on said wheels, an arbor supporting one of said pulleys, and straining devices for said arbor, comprising hollow shanks movable longitudinally in the saw frame and provided at their inner ends with threaded bearings means at the outer ends of said shanks for supporting the arbor, a screw shaft screwed in the threaded bearing at the inner end of said tubular shanks, levers having openings receiving the screw shaft, nuts turning loosely within the said openings in the levers and threaded on the screw shaft and provided with heads abutting the opposite edges of the levers, swinging links connecting the upper ends of the levers with the saw frame, a shaft having cranks connected with the lower ends of the levers, and operating devices in connection with said shaft.

2. In a sawing apparatus a straining gear comprising a shank provided with arbor supporting means, a screw shaft connected with said shank, a lever having an opening receiving said screw shaft, and nuts turning loosely within said opening in the lever and threaded on the screw shaft.

3. The combination with a saw frame, a band saw, pulleys supporting said saw, and arbors for said pulleys, of a straining gear in connection with one of said arbors, and comprising shanks movable longitudinally in the saw frame, tension devices in connection with said shanks for forcing the same inwardly or outwardly to strain the band saw, carriages supporting the outer end of said shanks and tracks on which said carriages operate.

4. The combination of a saw frame, a band saw, means supporting the band saw including arbors, a straining device in connection with one of said arbors, and including tubular shanks movable longitudinally in the saw frame and provided at their outer ends with means for supporting said arbor, means for sustaining the weight of the outer ends of said shanks when extended, levers and connections between the same and their respective shanks, and means for operating the levers whereby to put a strain upon the band saw.

5. The combination substantially as described of the shanks provided at their outer ends with means for supporting an arbor, and having threaded bearings at their inner ends, screw shafts threaded in said bearings, levers having openings through which the screw shafts extend, nuts threaded on the screw shafts and turning loosely within the openings in the levers, and means for operating the levers.

EVAN T. DAVIES.

Witnesses:
 SOLON C. KEMON,
 PERRY B. TURPIN.